United States Patent [19]

Mylonakis et al.

[11] Patent Number: 4,866,126

[45] Date of Patent: Sep. 12, 1989

[54] POLYMER BLEND COMPOSITIONS INCLUDING COPOLYMER COMPATIBILIZING AGENTS

[75] Inventors: Stamatios G. Mylonakis, Barrington; Susan R. Mrozack, Highland Park, both of Ill.

[73] Assignee: Borg-Warner Chemicals, Inc., Parkersburg, W. Va.

[21] Appl. No.: 188,162

[22] Filed: Apr. 15, 1988

[51] Int. Cl.[4] .................... C08L 53/00; C08L 71/04
[52] U.S. Cl. .................................. 525/68; 525/92; 525/242; 525/260; 525/302; 525/391; 525/392; 525/397
[58] Field of Search ..................... 525/68, 905, 92

[56] References Cited

U.S. PATENT DOCUMENTS

| | | |
|---|---|---|
| 3,383,435 | 5/1968 | Cizek . |
| 3,792,122 | 2/1974 | Fromuth, Jr. et al. . |
| 3,835,200 | 9/1974 | Lee, Jr. . |
| 4,158,028 | 6/1979 | Izawa et al. . |
| 4,226,951 | 10/1980 | White . |
| 4,309,513 | 1/1982 | Ueno et al. . |
| 4,360,618 | 11/1982 | Trementozzi . |
| 4,405,753 | 9/1983 | Deets et al. . |
| 4,460,743 | 7/1974 | Abe et al. . |
| 4,473,679 | 9/1984 | Falk et al. . |
| 4,486,568 | 12/1984 | Miyashita et al. . |
| 4,526,927 | 7/1985 | Hambrecht et al. . |
| 4,536,543 | 8/1985 | Matzner et al. . |
| 4,556,685 | 12/1985 | Sugio et al. . |
| 4,578,423 | 3/1986 | Deets et al. . |
| 4,588,623 | 5/1986 | Hartsing, Jr. . |
| 4,604,425 | 8/1986 | Ohmura et al. . |
| 4,644,034 | 2/1987 | Tanaka et al. . |

OTHER PUBLICATIONS

Banderet, A.; Tournut, C.; Riess, G., *J. Polym. Sci.*: 1967, 16, 2601-2613. "Study of the Compatibility of Copolymers with Corresponding Homopolymers System: Polystyrene-Polymethyl Methacrylate."
Freyss, D.; Ling, M.; Rempp, P., *Bull. Soc. Chem. France*, 1964, 2, 221-224, "Preparation and Characterization of Sequenced Styrene-Methyl Methacrylate Copolymers."
Inoue, T.; Soen, T.; Hashimoto, T.; Kawai, H., *Macromolecules*, 1970, 3, 87-92, "Studies on Domain Formation of the A-B-Type Copolymer from its Solutions. Ternary Polymer Blend of the Styrene-Isoprene Block Copolymer with Polystyrene and Polyisoprene."
Kohler, J.; Riess, G.; Banderet, A., *Dur. Polym. J*, 1968, 4, 173-185. "Study of Ternary Systems: Resin Elastomer Corresponding Block Copolymer-I. Compatibility of the Polystyrene-Polyisoprene System."
Periard, J.; Riess, G., *Kolloid-Z.u.Z. Polymer*, 1972, 248, 877-882. "Emulsifying Effect of Block Polystyrene-Polymethyl Methacrylate Copolymers."
Banderet, A. et al, "Study of the Compatability of Copolymers with Corresponding Homopolymers System: Polystyrene-Polymethyl Methacrylate", *Journal of Polymer Science*, 1967, 16, pp. 2601-2613 (English language translation).
Kohler, J. et al, "Study of Ternary Systems: Resin Elastomer Corresponding Block Copolymer-I. Compatibility of the Polystyrene-Polyisoprene System", *European Polymer Journal*, 1968, 4, pp. 173-185 (English language abstract).
English language abstract of the Freyss et al publication.
English language abstract of the Periard et al publication.

*Primary Examiner*—Jacob Ziegler
*Attorney, Agent, or Firm*—Lowe, Price, LeBlanc, Becker & Shur

[57] ABSTRACT

Polymer blend compositions comprise a polyphenylene ether polymer, a styrene-acrylonitrile polymer and a copolymer compatiblizing agent in an amount sufficient to effect improved compatability between the polyphenylene ether polymer and the styrene-acrylonitrile polymer. The copolymer compatibilizing agent comprises a graft copolymer of A graft polymerized to B or a block copolymer of A block polymerized with B. A and B comprise polymers which are immiscible with one another, and one of A and B is miscible with the polyphenylene ether polymer while the other of A and B is miscible with the styrene-acrylonitrile polymer.

18 Claims, No Drawings

POLYMER BLEND COMPOSITIONS INCLUDING COPOLYMER COMPATIBILIZING AGENTS

FIELD OF THE INVENTION

The present invention relates to polymer blend compositions which include copolymer compatibilizing agents. More particularly, the present invention relates to blends of at least one polyphenylene ether polymer and at least one styrene-acrylonitrile polymer, which blends further include a copolymer compatibilizing agent in an amount sufficient to effect improved compatibility between the polyphenylene ether polymer and the styreneacrylonitrile polymer. The improved compatibility of the blend compositions is indicated by the improved physical properties exhibited by the polymer blend compositions, including, for example, higher heat distortion temperatures and/or lower melt viscosities, as compared with blends which do not include a compatibilizing agent.

BACKGROUND OF THE INVENTION

Polyphenylene ether resins are known in the art and exhibit a desirable combination of chemical, physical and electrical properties over a temperature range of more than about 650° F., extending from a brittle point of about −275° F. to a heat distortion temperature of about 375° F. This combination of properties renders polyphenylene ether resins suitable for a broad range of applications. However, the usefulness of polyphenylene ether resins is limited in some applications as a consequence of processability, impact resistance, and chemical resistance.

As a result, polyphenylene ether resins have been blended with other polymer resins in order to improve processability, impact resistance and chemical resistance. For example, the Cizek U.S. Pat. No. 3,383,435 discloses blends of polyphenylene ether and one or more styrene resins having improved properties. The Deets et al U.S. Pat. No. 4,578,423 discloses blends of polyphenylene oxide with styrene-acrylonitrile (SAN) or acrylonitrile-butadiene-styrene (ABS) polymers. These blends are disclosed as exhibiting improved solvent resistance without loss in heat distortion temperature and impact strength. Similar blends of polyphenylene oxide with SAN or ABS polymers are also disclosed in the Trementozzi U.S. Pat. No. 4,360,618.

It is further known to include additional polymers in polyphenylene ether-styrene polymer blends in order to further improve the overall physical and chemical properties of the blend compositions. For example, the Lee, Jr. U.S. Pat. No. 3,835,200 discloses blends of polyphenylene ether, a graft copolymer of a diene rubber with a styrene monomer, and a normally rigid block copolymer of a vinyl aromatic compound and a conjugated diene. These blends are disclosed as exhibiting improved toughness. The Deets et al U.S. Pat. No. 4,405,753 discloses blends of polyphenylene oxide, a SAN or ABS polymer, and a styrene-maleic anhydride copolymer, which blends are disclosed as exhibiting advantageous impact strength and heat distortion temperatures. The Hambrecht et al U.S. Pat. No. 4,526,927 discloses blends including a polyphenylene ether, a styrene polymer, and, as a component for improving the impact strength, a block copolymer obtained by reacting an ethylene copolymer with an active polymeric anion. Hartsing, Jr. et al disclose in U.S. Pat. No. 4,588,623 a blend of a poly(arylether) polymer, a styrene and/or acrylic copolymer, and a compatibilizing amount of a polyhydroxy ether. Additional blend compositions including polyphenylene ether, a polystyrene polymer, and one or more additional polymers are disclosed in the Ueno et al U.S. Pat. No. 4,309,513, the Abe et al U.S. Pat. No. 4,460,743 and the Sugio et al U.S. Pat. No. 4,556,685.

Thus, various blends of polyphenylene ether and styrene polymers are known which exhibit one or more improved physical and/or chemical properties.

SUMMARY OF THE INVENTION

It is an object of the present invention to provide polymer blend compositions including at least one polyphenylene ether polymer and at least one styreneacrylonitrile polymer. It is a further object of the invention to provide polymer blend compositions comprising at least one polyphenylene ether polymer, at least one styrene-acrylonitrile polymer, and a compatibilizing agent in an amount sufficient to effect improved compatibility between the polyphenylene ether polymer and the styreneacrylonitrile polymer. It is a further object of the invention to provide blend compositions which exhibit improved physical properties.

These and additional objects will be provided by the polymer blend compositions of the present invention which comprise at least one polyphenylene ether polymer, at least one styrene-acrylonitrile polymer, and a copolymer compatibilizing agent in an amount sufficient to effect improved compatibility between the polyphenylene ether polymer and the styrene-acrylonitrile polymer as compared with blend compositions not including a compatibilizing agent. The copolymer compatibilizing agent comprises a graft copolymer of A graft polymerized to B or a block copolymer of A block polymerized with B, wherein A and B comprise polymers which are immiscible with one another. Additionally, one of A and B is miscible with the polyphenylene ether polymer while the other of A and B is miscible with the styreneacrylonitrile polymer. The blend compositions according to the present invention exhibit improved physical properties as compared with blends which do not include the copolymer compatibilizing agent.

These and additional objects and advantages of the polymer blend compositions according to the present invention will be more fully understood in view of the following detailed description.

DETAILED DESCRIPTION

The polymer blend compositions of the present invention comprise at least one polyphenylene ether polymer, at least one styrene-acrylonitrile polymer, and a copolymer compatibilizing agent in an amount sufficient to effect improved compatibility between the polyphenylene ether polymer and the styrene-acrylonitrile polymer as compared with blend compositions not including the copolymer compatibilizing agent. The improved compatibility of the polyphenylene ether polymer and the styrene-acrylonitrile polymer provides the blend compositions with improved physical properties as will be set forth in detail below.

Polyphenylene ether polymers suitable for use in the polymer blend compositions of the present invention comprise polymers and copolymers having repeating structural units of the following general formula:

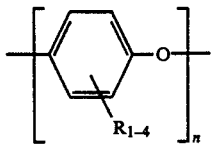

wherein $R_1$, $R_2$, $R_3$, and $R_4$ each individually represent a monovalent substituent such as hydrogen, halogen, alkyl, aryl, alkoxy and other hydrocarbon groups, and n represents the degree of polymerization. Preferably, n is at least 20, and more preferably, n is at least 50. Preferably, not all of $R_1$–$R_4$ are hydrogen.

The polyphenylene ether polymers suitable for use in the polymer blend compositions of the present invention are well known in the art and may be prepared by any of a number of processes known in the art from corresponding phenols or reactive derivatives thereof. Examples of polyphenylene ether resins and methods for their production are set forth in the Hay U.S. Pat. Nos. 3,306,874 and 3,306,875 and in the Stamatoff U.S. Pat. Nos. 3,257,357 and 3,257,358, all of which are incorporated herein by reference. Throughout the Specification and claims the term "polyphenylene ether" includes unsubstituted polyphenylene ether homopolymer, substituted polyphenylene ether homopolymer and substituted and unsubstituted polyphenylene ether copolymers.

Preferred polyphenylene ether polymers adapted for use in the polymer blend compositions of the present invention include, but are not limited to, poly(2,6-dimethyl-1,4-phenylene)ether; poly(2,6-diethyl-1,4-phenylene)ether; poly(2-methyl-6-ethyl-1,4phenylene)ether; poly(2-methyl-6-propyl-1,4phenylene)ether; poly(2,6-dipropyl-1,4-phenylene)ether; poly(2-ethyl-6-propyl-1,4-phenylene)ether; poly(2,6-dilauryl-1,4-phenylene)ether; poly(2,6-diphenyl-1,4phenylene)ether; poly(2,6-dimethoxy-1,4-phenylene)ether; poly(,6-diethoxy-1,4-phenylene)ether; poly(2-methoxy-6-ethoxy-1,4-phenylene)ether; poly(2-ethyl-6-styaryloxy-1,4phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4phenylene)ether; poly(2-chloro-1,4-phenylene)ether; poly(2,6-dibromo-1,4-phenylene)ether; and the like. Polyphenylene ether copolymers are also preferred for use in the blends of the invention, with a particularly preferred copolymer being formed from 2,6-dimethylphenol and 2,5,6-trimethylphenol in a 95:5 weight ratio.

The blend compositions of the invention may include one or more of the polyphenylene ether polymers as discussed above. The blend compositions further include at least one styrene-acrylonitrile polymer. Various styrene-acrylonitrile polymers suitable for use in the blend compositions of the invention are well known in the art. Generally, styrene-acrylonitrile copolymers having a styrene to acrylonitrile weight ratio in the range of about 1:5 to about 5:1 are preferred. More preferably, the styrene-acrylonitrile polymer has a styrene to acrylonitrile weight ratio of about 1:3 to about 3:1. One or more styrene-acrylonitrile polymers may be included in the blend compositions. The styrene portion of the polymer may be formed from styrene monomer, substituted styrene monomer, for example, alpha or nuclear substituted styrene having one or more halogen and/or alkyl substituents, or mixtures thereof. Preferred alkyl substituents contain 1 to 4 carbon atoms.

In order to effect improved compatibility between the polyphenylene ether polymer and the styrene-acrylonitrile polymer, the blend compositions according to the present invention further include a copolymer compatibilizing agent in an amount sufficient to effect improved compatibility between the polyphenylene ether polymer and the styrene-acrylonitrile polymer as compared with blend compositions which do not include a compatibilizing agent. The compatibilizing agent comprises a graft copolymer of A graft polymerized to B or a block copolymer of A block polymerized with B.

A and B comprise polymers which are immiscible with one another. Additionally, one of A and B is miscible with the polyphenylene ether polymer while the other of A and B is miscible with the styreneacrylonitrile polymer.

When the copolymer compatibilizing agent comprises a graft copolymer, the graft copolymer may be of the general formula I:

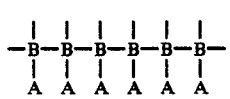
(I)

wherein B comprises the backbone polymer and A comprises the polymer grafted thereto. When the copolymer compatibilizing agent comprises a block copolymer, the block copolymer may be of the general formula II:

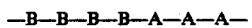
(II)

Preferably, in either the graft or the block copolymer compatibilizing agent, the A and B components are included in a weight ratio in the range of from about 5:1 to about 1:5. As set forth above, A and B are immiscible with one another, one of A and B is miscible with the polyphenylene ether polymer, and the other of A and B is miscible with the styrene-acrylonitrile polymer. In a preferred embodiment, the one of and B which is miscible with the polyphenylene ether polymer comprises polyphenylene ether, or a copolymer thereof, or a polystyrene polymer. Suitable polystyrene polymers include unsubstituted polystyrene and polystyrene substituted at the alpha and/or a nuclear position with, for example, one or more halogen and/or alkyl groups having 1 to 4 carbon atoms. In an additionally preferred embodiment, the one of A and B which is miscible with the styrene-acrylonitrile polymer comprises styrene-acrylonitrile copolymer, an acrylate or methacrylate polymer or copolymer, or alkyl substituted derivatives thereof. Additional copolymer components A and B which are miscible with either the polyphenylene ether component or the styrene-acrylonitrile component are within the scope of the invention.

The graft and block copolymers which are suitable for use as the copolymer compatibilizing agent in the polymer blend compositions of the present invention may be prepared by any of the graft and block polymerization methods known in the art, including free radical solution polymerization, emulsion polymerization, anionic polymerization and group transfer polymerization. Examples of the various methods suitable for use in preparing the graft and block copolymers according to the present invention are set forth in detail in the Examples below.

The polymer blend compositions include the copolymer compatibilizing agent in an amount sufficient to effect improved compatibility between the polyphenylene ether polymer and the styrene-acrylonitrile polymer as compared with blend compositions which do not include the compatibilizing agent. Generally, only small amounts of the copolymer compatibilizing agent are necessary for providing the improved compatiblity between the polyphenylene ether and the styrene-acrylonitrile polymer. Preferably, the copolymer compatibilizing agent is included in an amount of from about 1 to about 20 weight percent, based on the total weight of the blend compositions. In most cases, the copolymer compatibilizing agent is included in an amount of from about 1 to about 10 weight percent in order to provide the improved compatibility between the polymer components.

Generally, the polyphenylene ether polymer may be included in the blend compositions in an amount of from about 5 to about 95 weight percent, and the styreneacrylonitrile polymer may be included in an amount of from about 5 to about 95 weight percent, both being based on the total weight of the resin components of the blend compositions. In preferred embodiments, the polyphenylene ether polymer is included in an amount of from about 60 to about 95 weight percent and the styrene-acrylonitrile polymer is included in an amount of from about 5 to about 40 weight percent, based on the weight of the resin components of the blend composition. In additionally preferred embodiments, the blend compositions include from about 60 to about 70 weight percent polyphenylene ether, acrylonitrile and 1 to 10 weight percent of the copolymer compatibilizing agent.

The copolymer compatibilizing agents and the blend compositions including the copolymer compatibilizing agents will be more fully understood in view of the following Examples which are set forth to illustrate specific embodiments of the invention.

EXAMPLE 1

This example demonstrates the preparation of a compatibilizing agent suitable for use in the polymer blend compositions of the present invention. The copolymer compatibilizing agent was prepared using free radical, solution polymerization method. The following ingredients were charged into a reaction container: cyclohexane (413.0g, 4.90 moles), polystyrene macromonomer terminated with methacrylate (70.0 g, 5.6 mmoles), styrene monomer (50.4g, 484 mmoles), acrylonitrile monomer (19.6 g, 369 mmoles), 2,2-azobis(2-methylpropanenitrile) initiator (1.10 g, 6.70 mmoles), and tertiary dodecylmercaptane (TDDM) (0.7 mL, 2.9 mmoles). The reaction container was capped with a serum stopper and purged with nitrogen for ten minutes. The serum stopper was replaced with a rubber lined metal cap and the reaction container was placed in a shaker bath at 74° C. for approximately 17.5 hours. A milky white suspension product was formed. The suspension was precipitated using a three fold excess of methanol to yield a white product which was air dried overnight and vacuum dried in an oven at 50° C. for an additional two days. In an alternate embodiment, the solvent may be allowed to evaporate slowly and the resulting material may be dried at 105° C. for two days. The process yield was 96 percent of a copolymer comprising polystyrene graft polymerized to a styrene-acrylonitrile backbone in a "comb-like" manner as illustrated by formula I as set forth above. The weight ratio of the polystyrene to the styrene-acrylonitrile was approximately 1:1.

EXAMPLE 2

The General procedure of Example 1 was repeated using different ingredients in the reaction container. More particularly, methacrylate end-capped low molecule weight polyphenylene ether copolymer macromonomer formed from a 95:5 ratio of 2,6-dimethylphenol and 2,5,6-trimethylphenol (50.0g) styrene monomer (34.2g), butyl acrylate monomer (2.5g), acrylonitrile monomer (13.3g), chlorobenzene (400g) and 2,2-azobis(2-methylpropanenitrile) initiator (1.5g). The resultant copolymer product was precipitated in methanol and dried under vacuum at 90° C. The product yield was approximately 90 percent of a copolymer comprising polyphenylene ether copolymer graft polymerized to a styrene-acrylonitrile-butyl acrylate backbone in a "comblike" manner with a weight ratio of polyphenylene ether copolymer to styrene acrylonitrile-butyl acrylate copolymer of approximately 1:1.

EXAMPLE 3

The general procedure of Example 2 was repeated except that the styrene, butyl acrylate and acrylonitrile monomers were replaced with methyl methacrylate monomer (50.0g). The product yield was approximately 72 percent of a copolymer comprising polyphenylene ether copolymer graft polymerized to a methyl methacrylate backbone polymer in an approximately 1:1 weight ratio.

COMPARATIVE EXAMPLE 1

For purposes of comparison, blend compositions were prepared which did not include a copolymer compatibilizing agent. Specifically, both solution and melt blends of the aforementioned polyphenylene ether copolymer and a styrene acrylonitrile copolymer (containing about 27 weight percent acrylonitrile) were prepared in varying compositions as set forth in Table I. The heat distortion temperature of injection molded samples and the melt viscosity of each blend composition was measured, the results of which are also set forth in Table I. The heat distortion temperature was measured according to ASTM D648 at 264 psi while the melt viscosity was measured at 550° F., 500sec.-1 using a 15/1 L/d, 0.041 inch diameter capillary rheometer. The results of the measurements for the various compositions are set forth in Table I wherein PEC represents the polyphenylene ether copolymer and SAN represents the styrene acrylonitrile in weight percents.

TABLE I

| (Blends Without Compatibilizing Agent) | | | |
|---|---|---|---|
| PEC | SAN | HDT,°F. | Melt Viscosity, Poise |
| Solution Blends: | | | |
| 95 | 5 | 378 | 22,000 |
| 90 | 10 | 372 | 9,500 |
| 80 | 20 | 367 | 8,100 |
| 70 | 30 | 320 | 6,800 |
| 65 | 35 | 248 | 7,200 |
| 60 | 40 | 230 | 5,100 |
| 50 | 50 | 225 | 3,300 |
| Melt | | | |

TABLE I-continued (Blends Without Compatibilizing Agent)

| | PEC | SAN | HDT,°F. | Melt Viscosity, Poise |
|---|---|---|---|---|
| Blends: | 95 | 5 | 362 | 17,000 |
| | 90 | 10 | 348 | 12,000 |
| | 80 | 20 | 342 | 9,000 |
| | 70 | 30 | 326 | 6,100 |
| | 65 | 35 | 248 | 5,000 |
| | 60 | 40 | 225 | 5,000 |
| | 50 | 50 | 225 | 3,800 |
| | 40 | 60 | 224 | 2,400 |

As is observed from Table I, the above blend compositions of polyphenylene ether and styrene acrylonitrile exhibit melt viscosities less than about 5000 poise at 550° F. and 500 sec.$^{-1}$ compositions include at least 50 weight percent styrene acrylonitrile. Moreover, the above blend compositions exhibit a heat distortion temperature greater than about 320° F. only when the polyphenylene ether is included in at least 70 weight percent. Thus, it is difficult to provide blends of polyphenylene ether and styrene acrylonitrile which exhibit both a desirable heat distortion temperature and a desirable melt viscosity.

EXAMPLE 4

This example demonstrates polymer blend compositions according to the present invention and including the copolymer compatibilizing agent of Example 1. Specifically, blend compositions including the polyphenylene ether and the styrene acrylonitrile of Comparative Example 1 were prepared. The blend compositions of the present example further included the copolymer compatibilizing agent of Example 1. The blend compositions were prepared by dry blending followed by melt mixing using either a Brabender (single screw) or a Haake (twin screw) extruder. The blends were pelletized and then injection molded into test samples. The blend compositions were subjected to measurement of the heat distortion temperature and the melt viscosity according to the procedures set forth in Comparative Example 1. The weight percents of the blend components included in the compositions and the results of the heat distortion temperature and melt viscosity measurements are set forth in Table II.

TABLE II (CCA of Example 1)

| PEC | SAN | CCA | HDT,°F. | Melt Viscosity, Poise |
|---|---|---|---|---|
| 66 | 29 | 5 | 333 | 4000 |
| 63 | 27 | 10 | 342 | 4900 |
| 55 | 40 | 5 | 219 | 2800 |
| 55 | 35 | 10 | 230 | 2800 |

From the results set forth in Table II, it is evident that the inclusion of the copolymer compatibilizing agent (CCA) in the polyphenylene etherstyrene acrylonitrile polymer blends provides compositions containing less than 70 weight percent polyphenylene ether with heat distortion temperatures greater than 320° F. The inclusion of the copolymer compatibilizing agent also provides blend compositions containing less than 50 weight percent styrene acrylonitrile with melt viscosities at 550° F. and 500sec.$^{31}$ $^1$ of less than 5000 poise. Thus, the copolymer compatibilizing agents of the present invention assist the resultant blend compositions in exhibiting higher heat distortion temperatures and/or lower melt viscosities as compared with blends not including the copolymer compatibilizing agents.

EXAMPLE 5

Polymer blend compositions were prepared according to the general procedure set forth in Example 4 except that the copolymer compatibilizing agent comprised the copolymer prepared in Example 2. The resultant blends were subjected to measurement of the heat distortion temperature and the melt viscosity according to the procedures set forth above. The weight percentages of components included in the blend compositions and the results of the heat distortion temperature and melt viscosity measurements are set forth in Table III.

TABLE III (CCA of Example 2)

| PEC | SAN | CCA | HDT,°F. | Melt Viscosity, Poise |
|---|---|---|---|---|
| 75 | 25 | 5 | 343 | 4400 |
| 66 | 29 | 5 | 338 | 4400 |
| 60 | 35 | 5 | 320 | 4000 |
| 55 | 40 | 5 | 232 | 2400 |
| 45 | 50 | 5 | 216 | 2100 |

The results set forth in Table III also demonstrate that the copolymer compatibilizing agent of Example 2 increases the heat distortion temperature and/or lowers the melt viscosity of the blend compositions.

EXAMPLE 6

Blend compositions were prepared according to the general procedure set forth in Example 4 except that the copolymer compatibilizing agent comprised the copolymer prepared in Example 3. The blend compositions were subjected to measurement of the heat distortion temperature and the melt viscosity according to the procedures set forth above. The weight percentages of the blend components in the compositions and the results of the heat distortion temperature and melt viscosity measurements are set forth in Table IV.

TABLE IV (CCA of Example 3)

| PEC | SAN | CCA | HDT,°F. | Melt Viscosity, Poise |
|---|---|---|---|---|
| 70 | 25 | 5 | 356 | 6200 |
| 66 | 29 | 5 | 342 | 6000 |
| 60 | 35 | 5 | 277 | 4600 |
| 60 | 30 | 10 | 388 | 4300 |
| 55 | 40 | 5 | 230 | 3600 |

The results set forth in Table IV further demonstrate that the copolymer compatibilizing agents according to the present invention provide compositions with increased heat distortion temperatures and/or lower melt viscosities.

Similar polyphenylene ether and styreneacrylonitrile copolymer containing blend compositions have been prepared including copolymer compatibilizing agents prepared by emulsion polymerization and comprising, for example, styrene-acrylonitrile graft polymerized to a polystyrene backbone and styrene-acrylonitrile graft polymerized to polystyrene in a core/shell configuration as set forth in the commonly assigned U.S. Pat. No. 4,473,679 which is incorporated herein by reference. Similar polyphenylene ether and styrene-acrylonitrile copolymer containing blends have also been prepared including copolymer compatibilizing agents prepared by anionic polymerization and group transfer polymerization, comprising, for example, polystyrene block polymerized with methyl methacrylate. Additional copolymer compatibilizing agents suitable for use in the blend compositions have been prepared by reacting a higher molecular weight polyphenylene ether homopolymer or copolymer macromonomer with styrene and acrylonitrile monomers, styrene, acrylonitrile and butyl acrylate monomers or methyl methacrylate monomers as set forth in Examples 2 and 3. Additional polymer blend compositions according to the present invention have also been prepared including minor amounts of other polymer components in addition to the polyphenylene ether and styreneacrylonitrile polymers. For example, similar compositions have been prepared further including a polystyrene component in amounts of 1 to 20 weight percent. Suitable polystyrene components include both rigid and rubber modified styrene polymers.

The preceding Examples are set forth to illustrate specific embodiments of the invention and are not intended to limit the scope of the compositions of the present invention. Additional embodiments and advantages within the scope of the claimed invention will be apparent to one of ordinary skill in the art.

What is claimed is:

1. A polymer blend composition, comprising at least one polyphenylene ether polymer, at least one styrene-acrylonitrile polymer and a copolymer compatibilizing agent in a amount sufficient to effect compatibility between the polyphenylene ether polymer and the styrene-acrylonitrile polymer, said copolymer compatibilizing agent being a block copolymer comprising A block polymerized with B, wherein A and B are polymers which are immiscible with one another, and wherein one of A and B is miscible with the polyphenylene ether polymer and is selected from the group consisting of polyphenylene ether polymers or copolymers and polystrene polymers, and the other of A and B is miscible with the styrene-acrylonitrile polymer and is selected from the group consisting of styrene-acrylonitrile polymers, acrylate polymers or copolymers, and methacrylate polymers or copolymers.

2. A polymer blend composition as defined by claim 1, wherein the copolymer compatiblizing agent is included in an amount of form about 1 to about 20 weight percent.

3. A polymer blend composition as defined by claim 2, wherein the copolymer compatiblizing agent is included in an amount of from about 1 to about 10 weight percent.

4. A polymer blend composition as defined by claim 1, wherein the polyphenylene ether polymer is included in an amount of from about 5 to about 95 weight percent and the styrene-acrylonitrile polymer is included in an amount of from about 5 to about 95 weight percent.

5. A polymer blend composition as defined by claim 4, wherein the polyphenylene ether polymer is included in an amount of from about 60 to about 95 weight percent and the styrene-acrylonitrile polymer is included in an amount of from about 5 to about 40 weight percent.

6. A polymer blend composition as defined by claim 1, wherein the polyphenylene ether comprises at least about 65 weight percent of the composition.

7. A polymer blend composition as defined by claim 5, comprising from about 60 to about 70 weight percent polyphenylene ether polymer, from about 20 to about 40 weight percent styrene-acrylonitrile polymer, and from about 1 to about 10 weight percent copolymer compatibilizing agent.

8. A polymer blend composition as defined by claim 1, wherein A is miscible with the polyphenylene ether polymer and B is miscible with the styreneacrylonitrile polymer.

9. A polymer blend composition as defined by claim 1, wherein the copolymer compatibilizing agent is a block copolymer comprising polystyrene block polymerized with methyl methacrylate polymer.

10. A polymer blend composition as defined by claim 1, wherein the composition exhibits a heat distortion temperature of no less than about 320° F. and a melt viscosity of less than about 5000 at 550° F. and 500 sec.$^{-1}$.

11. A polymer blend composition, comprising at least one polyphenylene ether polymer, at least one styrene-acrylonitrile polymer and a copolymer compatibilizing agent in an amount sufficient to effect compatibility between the polyphenylene ether polymer and the styrene-acrylonitrile polymer, said copolymer compatibilizing agent being a graft copolymer comprising A graft polymerized to B, wherein A and B are polymers which are immiscible with one another, and wherein one of A and B is miscible with the polyphenylene ether polymer and is selected from the group consisting of polyphenylene ether polymers or copolymers and polystyrene polymers, and the other of A and B is miscible with the styrene-acrylonitrile polymer and is selected from the group consisting of styrene-acrylonitrile polymers, acrylate homopolymers, methacrylate homopolymers, and copolymers of styrene-acrylonitrile with an acrylate homopolymer or a methacrylate homopolymer.

12. A polymer blend composition as defined by claim 11, wherein A is miscible with the polyphenylene ether polymer and B is miscible with the styreneacrylonitrile polymer.

13. A polymer blend composition as defined by claim 11, wherein A is miscible with the styreneacrylonitrile polymer and B is miscible with the polyphenylene ether polymer.

14. A polymer blend composition as defined by claim 11, wherein the copolymer compatibilizing agent is a graft polymer comprising polystyrene graft polymerized to a styrene-acrylonitrile polymer.

15. A polymer blend composition as defined by claim 11, wherein the copolymer compatibilizing agent is a graft polymer comprising polyphenylene ether graft polymerized to a styrene-acrylonitrile polymer.

16. A polymer blend composition as defined by claim 11, wherein the copolymer compatibilizing agent is a graft polymer comprising polyphenylene ether graft polymerized to a styrene-acrylonitrile-butyl acrylate copolymer.

17. A polymer blend composition as defined by claim 11 wherein the copolymer compatibilizing agent is a graft polymer comprising polyphenylene ether graft polymerized to methyl methacrylate homopolymer.

18. A polymer blend composition as defined by claim 11, wherein the copolymer compatibilizing agent is a graft polymer comprising styrene-acrylonitrile polymer graft polymerized to a polystyrene polymer.

* * * * *